(12) United States Patent
Suzuki (10) Patent No.: US 12,255,561 B2
(45) Date of Patent: Mar. 18, 2025

(54) MOTOR CONTROL DEVICE (71) Applicant: DENSO CORPORATION, Kariya (JP)

(72) Inventor: Hidenobu Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 122 days.

(21) Appl. No.: 17/863,530

(22) Filed: Jul. 13, 2022

(65) Prior Publication Data

US 2023/0032063 A1 Feb. 2, 2023

(30) Foreign Application Priority Data

Jul. 30, 2021 (JP) .................................. 2021-125015

(51) Int. Cl.
| | |
|---|---|
| H02P 6/16 | (2016.01) |
| H02P 6/182 | (2016.01) |
| H02P 23/00 | (2016.01) |
| H02P 23/14 | (2006.01) |
| H02P 27/08 | (2006.01) |

(52) U.S. Cl.
CPC .......... *H02P 23/0004* (2013.01); *H02P 23/14* (2013.01); *H02P 27/08* (2013.01)

(58) Field of Classification Search
CPC .. H02P 23/14; H02P 6/16; H02P 27/08; H02P 6/182; H02P 23/0004
USPC ......................................................... 318/445
See application file for complete search history.

(56) References Cited

U.S. PATENT DOCUMENTS

| | | | | |
|---|---|---|---|---|
| 2003/0222617 | A1* | 12/2003 | Nakai | H02P 25/0925 318/701 |
| 2009/0030587 | A1* | 1/2009 | Yonezawa | F02D 41/28 701/115 |
| 2010/0264862 | A1 | 10/2010 | Kitagawa | |
| 2013/0154537 | A1* | 6/2013 | Kimura | G05B 13/02 318/561 |
| 2013/0200826 | A1* | 8/2013 | Yoshida | H02P 6/24 318/400.11 |
| 2015/0239496 | A1* | 8/2015 | Kozawa | B62D 5/0484 701/43 |
| 2016/0181955 | A1* | 6/2016 | Suzuki | H02M 7/00 318/400.14 |
| 2019/0181758 | A1* | 6/2019 | Satoh | H02M 3/158 |
| 2019/0368602 | A1* | 12/2019 | Sakaguchi | F16H 61/28 |
| 2020/0080634 | A1* | 3/2020 | Kamio | F16H 61/0006 |

FOREIGN PATENT DOCUMENTS

| | | |
|---|---|---|
| JP | 5144337 B2 | 2/2013 |
| JP | 2014-176220 A | 9/2014 |

* cited by examiner

*Primary Examiner* — Gabriel Agared
(74) *Attorney, Agent, or Firm* — POSZ LAW GROUP, PLC (57) ABSTRACT

A blower motor control device stops energization to a motor when a rotation speed of a rotor reaches a learn rotation speed, and acquires a correction amount as a new learn value for correcting a position error of the rotor relative to a Hall element by using an induced voltage in a coil of the motor and a detection signal from a rotation sensor. The blower motor control device stores the new learn value in a ROM. The blower motor control device corrects the position error by using a previous learn value read from the ROM, for energization control of the motor, until the rotation speed reaches the learn rotation speed.

9 Claims, 5 Drawing Sheets

MOTOR CONTROL DEVICE

CROSS REFERENCE TO RELATED APPLICATION

The present application is based on and claims the benefit of priority of Japanese Patent Application No. 2021-125015, filed on Jul. 30, 2021, the disclosure of which is incorporated herein by reference.

TECHNICAL FIELD

The present disclosure generally relates to a motor control device.

BACKGROUND INFORMATION

A comparative example of the motor control device sets an inertial rotation period of the rotor for stopping the energization of all phases of the stator coil and detects an induced voltage of at least one phase of the stator coil.

SUMMARY

It is an object of the present disclosure to provide a motor control device capable of constantly correcting position error that occurs in a rotation sensor.

The objects, features, and advantages disclosed in the specification will become apparent by referring to following detailed descriptions and accompanying drawings.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Embodiments of the present disclosure are described based on the drawings.

In the present embodiment, as an example, an embodiment in which the motor control device of the present disclosure is applied to a blower motor control device 100 for a vehicle is adopted. The blower motor control device 100 controls a so-called blower motor used for blowing air from an in-vehicle air conditioner. Therefore, a motor 30 in the following is an example of a blower motor. However, the motor control device of the present disclosure may control a motor different from the blower motor. The motor control device of the present disclosure may also be applied to a device for controlling an electric fan motor.

The blower motor control device 100 includes at least a microcontroller 10. Further, in the present embodiment as an example, a configuration, in addition to the microcontroller 10, including circuit elements such as an inverter circuit 20, a Hall element 41, a comparator 42, a voltage dividing circuit 50, a current sensor 60, a choke coil 71, and a reverse connection prevention FET 72 is adopted. It can be said that the microcontroller 10 corresponds to a motor control device in claims.

The blower motor control device 100 is electrically connected to the motor 30, a battery 200, and an air conditioner ECU 300. The blower motor control device 100 may be integrally configured with the motor 30. The structure in which the blower motor control device 100 and the motor 30 are integrated may also be called as a motor unit. As for the motor unit, for example, the motor 30 is attached to a case accommodating the blower motor control device 100. However, the blower motor control device 100 is not limited to such, and may be provided separately from the motor 30.

Inverter Circuit

The inverter circuit 20 switches an electric power supplied to the coil of the stator 31 of the motor 30. For example, inverter FETs 21A and 21D switch the electric power to be supplied to a U-phase coil 31U, inverter FETs 21B and 21E switch the electric power to a V-phase coil 31V, and inverter FETs 21C and 21F switch the electric power to a W-phase coil 31W.

Each drain of the inverter FETs 21A, 21B, 21C is connected to a positive electrode of the vehicle-mounted battery 200 via the choke coil 71 for noise reduction. Further, each source of the inverter FETs 21D, 21E, and 21F is connected to a negative electrode of the battery 200 via the reverse connection prevention FET 72. The inverter circuit 20 may correspond to a drive unit.

Motor

Figure 1:
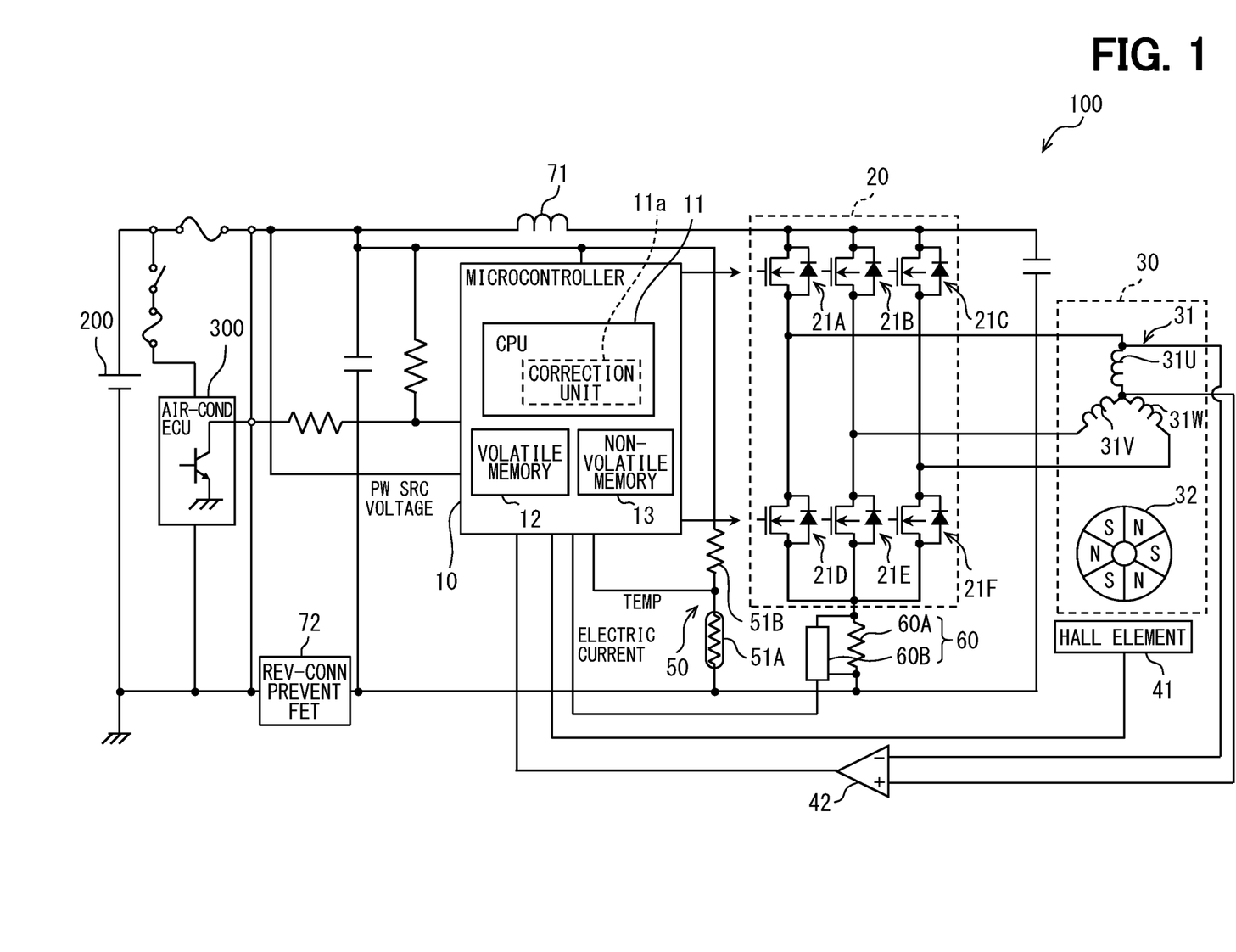
FIG. 1 is a block diagram of a schematic configuration of a blower motor control device according to an embodiment.

As shown in FIG. 1, the motor 30 includes a stator 31 and a rotor magnet 32. In addition to the above, the motor 30 includes a rotor, a shaft, a fan, and the like. The motor 30 is a brushless three-phase motor.

The stator 31 is an electromagnet in which coils 31U, 31V, and 31W are wound around a core member, and constitutes three phases, i.e., U phase, V phase, and W phase. Each of the U phase, V phase, and W phase of the stator 31 generates a rotating magnetic field by switching the polarity of the magnetic field generated by the electromagnet under control of the blower motor control device 100.

The rotor magnet 32 is provided inside the rotor. The rotor magnet 32 rotates the rotor by corresponding to the rotating magnetic field generated by the stator 31. The rotor is provided with a shaft. The shaft rotates integrally with the rotor. A fan such as a so-called sirocco fan is provided on the shaft. The in-vehicle air conditioner can blow air by rotating the fan together with the shaft.

Detector

The Hall element 41 has a Hall sensor corresponding to each of three phases. The Hall element 41 detects a magnetic field of the rotor magnet 32 provided coaxially with the shaft as indicating a rotation position of the rotor. The Hall element 41 outputs a detection signal (i.e., an output signal) to the microcontroller 10. The Hall element 41 corresponds to a rotation sensor in claims.

In the comparator 42, a neutral point of each of the phase coils 31U, 31V, 31W is connected to a negative input terminal, and one end of the U phase coil 31U is connected to a positive input terminal. The phase voltage (i.e., a combined voltage of the drive voltage and the induced voltage) of the U-phase coil 31U is input to the comparator 42. Then, the comparator 42 outputs a signal corresponding to the induced voltage among the phase voltages of the U-phase coil 31U. Therefore, the comparator 42 may be called as a circuit component for detecting the induced voltage.

The voltage divider circuit 50 has a thermistor 51A and a resistor 51B. Since a resistance value of the thermistor 51A changes according to temperature of a substrate of the circuit, the voltage of the signal output by the voltage dividing circuit 50 changes according to temperature of the substrate. The current sensor 60 has a shunt resistor 60A and an amplifier 60B that amplifies a potential difference between both ends of the shunt resistor 60A.

Microcontroller

The microcontroller 10 is mounted on the substrate together with the above circuit elements, for example. The microcontroller 10 is a microcontroller provided with a CPU 11, a volatile memory 12, a non-volatile memory 13, an input/output interface, a bus connecting the above, and the like. The microcontroller 10 is electrically connected to the inverter circuit 20, the Hall element 41, the comparator 42, the voltage dividing circuit 50, the current sensor 60, the battery 200, and the air conditioner ECU 300.

By executing the program stored in the non-volatile memory 13, the CPU 11 executes calculation using data stored in the volatile memory 12 and a signal acquired via the input/output interface. The microcontroller 10 performs a processing operation by executing a program by using the CPU 11.

The non-volatile memory 13 stores various programs executed by the CPU 11. Further, a learn value described later is rewritably stored in the non-volatile memory 13.

The CPU 11 uses a part of the volatile memory 12 as a learn flag. The learn flag is set to a value indicating whether or not the learn value is stored in the non-volatile memory 13. For example, the CPU 11 sets a value of the learn flag to 1 when the learn value is stored in the non-volatile memory 13, and sets a value of the learn flag to 0 when the learn value is not stored in the non-volatile memory 13. Further, the value of the learn flag becomes 0 when the power supply to the microcontroller 10 is stopped. That is, when the microcontroller 10 acquires the learn value and stores it in the non-volatile memory 13 during a period from a start of the supply of the operating power supply (i.e., power on) to a stop of the supply of the operating power supply (i.e., power off), the learn flag is set to a value of 1. Therefore, the learn flag may be called as information indicating whether or not the learn value is stored in the non-volatile memory 13 during a period from the power-on to the power-off. In other words, the learn flag is information indicating whether or not a learn process is executed in such a period from the power-on to the power-off. Therefore, even if the learn value is stored in the non-volatile memory 13, the learn flag becomes 0 when the power supply is stopped.

Note that "1" as a value of the learn flag is information indicating that the learn value is stored in the non-volatile memory 13. Note that "0" as a value of the learn flag is information indicating that the learn value is not stored in the non-volatile memory 13. Further, the information indicating that the learn value is stored in the non-volatile memory 13 may be called as information indicating that the storage of the learn value in the non-volatile memory 13 is complete. On the other hand, the information indicating that the learn value is not stored in the non-volatile memory 13 may be called as the information indicating that the storage of the learn value in the non-volatile memory 13 is incomplete.

However, the present disclosure is not limited to such a configuration. The CPU 11 may store information in the volatile memory 12, indicating (i) that the learn value is stored in the non-volatile memory 13 and (ii) that the learn value is not stored in the non-volatile memory 13. The learn values and learn process will be described in detail later.

The microcontroller 10 acquires a rotation speed and position (i.e., a rotation position) of the rotor based on the magnetic field (i.e., a detection signal) detected by the Hall element 41. The microcontroller 10 acquires a signal corresponding to the induced voltage of the U-phase coil 31U output from the comparator 42. Note that the rotation speed and rotation position of the rotor may be called as the rotation speed and rotation position of the motor 30.

The microcontroller 10 may calculate temperature of the substrate based on a change in the voltage of the signal output from the voltage dividing circuit 50. In the present embodiment, for convenience, the signal output from the voltage dividing circuit 50 is used as a signal based on the detection result of the thermistor 51A. Further, in the present embodiment, temperature of the substrate calculated based on the detection result of the thermistor 51A is defined as temperature of the substrate detected by the thermistor 51A. The microcontroller 10 may calculate an electric current value of the inverter circuit 20 based on the signal output by the amplifier 60B.

A control signal including an instruction value of the rotation speed from the air conditioner ECU 300 that controls an air conditioner in response to a switch operation of the air conditioner is input to the microcontroller 10. There are various cases of switch operation of the air conditioner. The operation of reducing the rotation of the motor 30 (i.e., a rotor) includes an operation of reducing an air volume of the air conditioner, an operation of increasing a set temperature of the air conditioner, and the like. For example, when a switch operation for lowering the air volume of the air conditioner and a switch operation for raising a set temperature of the air conditioner are performed, the air conditioner ECU 300 outputs an instruction for lowering the rotation speed of the motor 30 to the microcontroller 10. The air conditioner ECU 300 may be called as a high-level ECU. Therefore, the control signal may be called as a high-level instruction.

Further, the microcontroller 10 calculates a duty ratio of PWM control related to control of switching of the inverter circuit 20 based on, for example, (a) a control signal from the air conditioner ECU 300 and (b) a rotation speed and a rotation position of a rotor based on a signal from the Hall element 41. PWM is an abbreviation for Pulse Width Modulation. The microcontroller 10 controls the switching of the inverter circuit 20 so as to generate a voltage having a desired duty ratio. In such manner, the microcontroller 10 energizes and controls the motor 30 via the inverter circuit 20. The blower motor control device 100 may include a driver circuit between the microcontroller 10 and the inverter circuit 20. In such case, the microcontroller 10 switches and controls the inverter circuit 20 via the driver circuit.

By the way, note that the non-volatile memory 13 stores a program including various functions. Therefore, the microcontroller 10 can execute various functions by executing the program. The microcontroller 10 can be represented as having each of those function. That is, the microcontroller 10 includes a correction unit 11*a* as a functional block.

The position error of the rotor (i.e., the rotor magnet 32) and the Hall element 41 may be caused by (i) mounting errors when mounting the Hall element 41 and (ii) variations in characteristics due to aged deterioration of the Hall element 41. The correction unit 11*a* corrects the position error between the rotor and the Hall element 41. The correction unit 11*a* acquires a correction amount (i.e., electrical angle) for correcting the position error as a learn value.

For example, the correction unit 11*a* stops energizing the motor 30 when the rotor reaches a learn speed. The correction unit 11*a* turns off all the inverter FETs 21A to 21F in order to stop the energization of each of the phase coils 31U, 31V, 31W. In such manner, the phase voltage of the U-phase coil 31U input to the comparator 42 is controlled as only the induced voltage. That is, the induced voltage generated in each of the phases 31U, 31V, 31W reflects an actual magnetic pole position of the rotor, and indicates an ideal position of the Hall sensor. Therefore, an induced voltage is generated in each of the phase coils 31U, 31V, 31W due to inertial rotation after rotating the rotor at a predetermined rotation speed, and the induced voltage of the U-phase coil 31U is used in or as the induced voltage. The learn speed corresponds to a learn rotation speed in claims.

Thereafter, when the energization of the motor 30 is stopped, the correction unit 11*a* acquires (i.e., detects) the induced voltage generated in each of the U-phase coil 31U, the V-phase coil 31V, and the W-phase coil 31W of the motor 30. In the present embodiment, as an example, a configuration of acquiring the induced voltage of the U-phase coil 31U is adopted. The correction unit 11*a* acquires a learn value using the induced voltage and the detection signal from the Hall element 41. Further, the correction unit 11*a* corrects the position error based on the acquired learn value.

As the learn value acquisition method and correction method, for example, the method described in Japanese Patent No. 5144337 may be applicable. However, the learn value acquisition method and correction method are not limited to such a configuration. That is, when the rotation speed of the rotor reaches the learn speed and the energization of the motor 30 is stopped, as long as the method detects the induced voltage and uses the detection signal from the Hall element 41, any method may be adopted for acquiring the learn value.

The learn speed is a reference value for determining whether or not to stop energization of the motor 30. If the motor 30 is turned off during high-speed rotation, abnormal noise or the like may be generated, which may give the user a sense of discomfort. Therefore, the learn speed is preferably in a low speed rotation range in which the rotation speed is increasing at the time of starting the motor 30. That is, it may be preferable that the correction unit 11*a* stops the energization of the motor 30 in a state where the electric current is low, the torque ripple is small, and the rotation speed is low at which abnormal noise is unlikely to occur.

The process of acquiring the learn value may also be called as a learn process. Further, the process of correcting the position error may be called as a correction process. The correction unit 11*a* may be provided separately from the microcontroller 10.

Processing Operation

Figure 2:
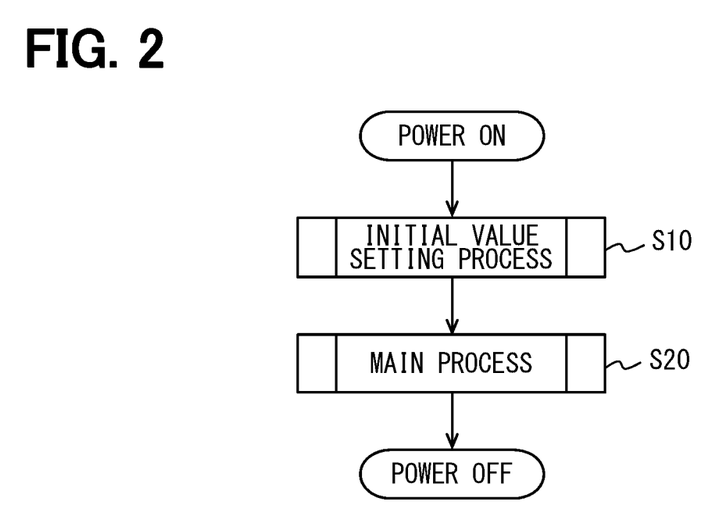
FIG. 2 is a flowchart of a processing operation of the blower motor control device according to the embodiment.
Figure 3:
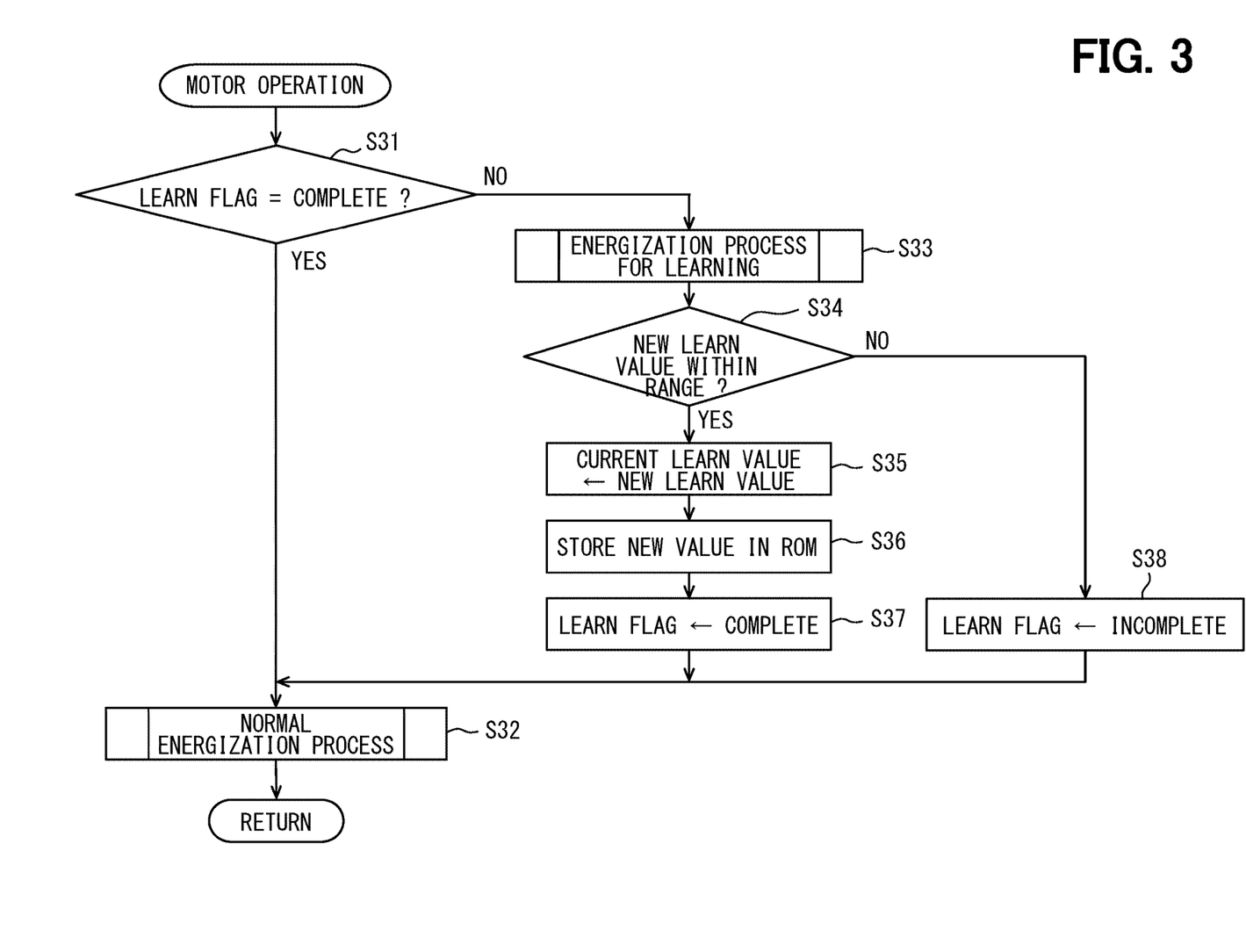
FIG. 3 is a flowchart of a processing operation when a motor of the blower motor control device is operated according to the embodiment.
Figure 4:
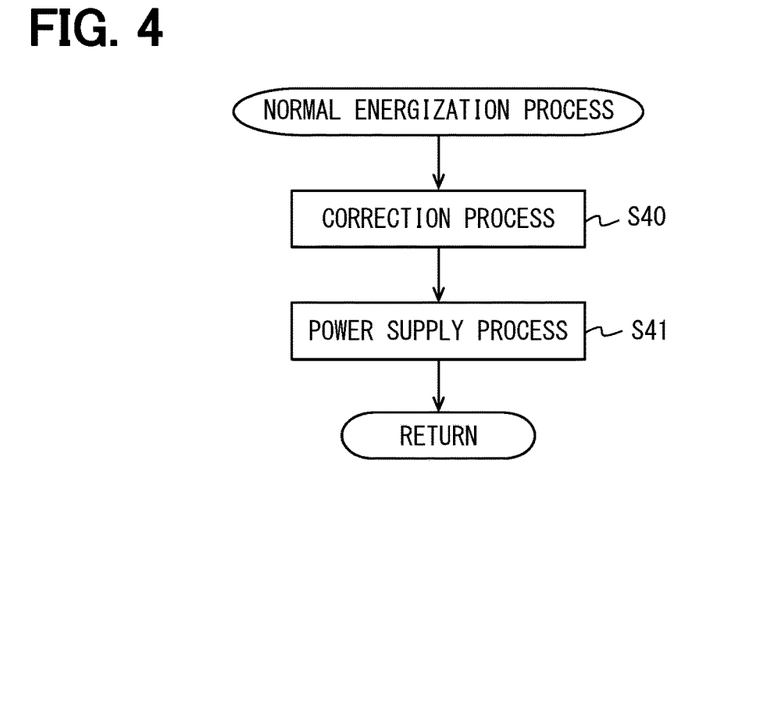
FIG. 4 is a flowchart of a processing operation when the blower motor control device is normally energized according to the embodiment.

Here, the processing operation of the blower motor control device 100 is described with reference to FIGS. 2 to 7. FIGS. 2 to 4 are flowcharts showing processes mainly performed by the microcontroller 10. When the electric power is turned on, the microcontroller 10 starts the process shown in the flowchart of FIG. 2. In other words, the microcontroller 10 starts when the operating power is supplied thereto, and starts the process shown in the flowchart of FIG. 2. Further, the microcontroller 10 performs the process shown in the flowchart of FIG. 2 until the power is turned off.

In step S10, an initial value setting process is performed. The microcontroller 10 sets a learn value (i.e., previous learn value) acquired in a previous learn process as the learn value (i.e., used learn value) used in the current correction process. Further, the used learn value in the correction process changes depending on the rotation speed and a storage status of the learn value. Therefore, the use learn value set in step S10 may be called as a tentative learn value.

The microcontroller 10 reads the previous learn value from the non-volatile memory 13. Then, the microcontroller 10 stores the read previous learn value in the volatile memory 12 or the like in order to use it in the current correction process.

Specifically, LEARN VALUE is a correction value associated with an error between an actual position of the rotor and a detected position of the rotor when the motor is operating at a learn speed. Wherein, in one embodiment, the actual position is based on measuring an induced voltage in a stator coil 31U as the motor rotates at a learn speed, and the detected position is based upon a Hall element 41 interacting with rotor magnets 32 as the motor rotates 30 at the learn speed.

NON-VOLATILE LEARN VALUE is a learn value that is stored in the non-volatile memory 13.

START-UP NON-VOLATILE LEARN VALUE is a learn value that is present when the microcontroller is turned ON, because the learn value was previously stored in the non-volatile memory 13 before power to the microcontroller 10 was previously turned off.

POST-START-UP NON-VOLATILE LEARN VALUE is a learn value that was stored into the non-volatile memory after start-up, thus overwriting any start-up non-volatile learn value that was present when the microcontroller was most recently turned ON.

VOLATILE LEARN VALUE is a learn value that is stored in the volatile memory 12, and is available for controlling the motor.

In step S20, a main process is performed. As part of the main process, the microcontroller 10 drives (i.e., operates) the motor 30 and stops the drive in response to a control signal from the air conditioner ECU 300. The microcontroller 10 starts the motor operation process shown in the flowchart of FIG. 3 as one of the main processes. More specifically, the microcontroller 10 operates the motor 30 according to a control signal from the air conditioner ECU 300, i.e., in response to a high-level instruction indicating an operation of the motor 30.

Here, the motor operation processing of the microcontroller 10 is described with reference to FIG. 3. The flowchart of FIG. 3 can be regarded as a process in the correction unit 11a.

In step S31, it is determined whether or not the learn flag=complete. Based on a value of the learn flag, the microcontroller 10 determines whether or not the storage of the learn value in the non-volatile memory 13 was performed after the microcontroller 10 was powered ON, thus overwriting the START-UP NON-VOLATILE LEARN VALUE with a POST-START-UP NON-VOLATILE LEARN VALUE.

That is, based on the value of the learn flag, the microcontroller 10 determines whether or not the learn process has been performed between the time when the microcontroller is turned ON and the present time of motor operation.

When the value of the learn flag is 1, the microcontroller 10 determines that the storage of the learn value in the non-volatile memory 13 is complete, and the process proceeds to step S32. In this case (learn flag is 1), any previous START-UP NON-VOLATILE LEARN VALUE has been overwritten by a POST-START-UP NON-VOLATILE LEARN VALUE.

Further, when the value of the learn flag is 0, the microcontroller 10 determines that the storage of the learn value in the non-volatile memory 13 is incomplete, and the process proceeds to step S33. In this case (learn flag is 0), a START-UP NON-VOLATILE LEARN VALUE is saved as an initial VOLATILE LEARN VALUE to perform the energization process for learning in step 33 to determine a new VOLATILE LEARN VALUE. The new VOLATILE LEARN VALUE is saved into the volatile memory as a POST-START-UP NON-VOLATILE LEARN VALUE. If power to the microcontroller 11 is turned OFF and then turned ON, a learn value in the non-volatile memory (during the OFF and ON) is redefined as a START-UP NON-VOLATILE LEARN VALUE.

As described later, in step S33, a learn process is performed. Therefore, the microcontroller 10 acquires the learn value (a new learn value) only when the learn value is not yet acquired. As a result, the microcontroller 10 can suppress the number of times of writing or the number of times of erasing of the non-volatile memory 13, and also suppress the number of times of acquiring a new learn value.

However, the present disclosure needs not include the learn flag. That is, the present disclosure does not have to include the learn flag when it is not necessary to determine whether or not the learn process has been performed from the power-on to the power-off. For example, the present disclosure does not have to include a process of determining the learn flag and the value of the learn flag (step S31) when the learn process is performed every time the motor 30 is driven from the stop. In such case, the microcontroller 10 can always perform the correction process using the latest learn value.

In step S33, an energization process for learning is performed (i.e., learn unit). In order to acquire a learn value, the microcontroller 10 controls energization of the motor 30 to acquire the learn value. Step S33 is a process for acquiring the latest learn value. The microcontroller 10 acquires a learn value by using the induced voltage and the detection signal from the Hall element 41. In one embodiment, this acquired or CURRENT LEARN VALUE is tested for reasonableness at S34 ("within a range"?). If this acquired or CURRENT is reasonable (S34=YES), then: (i) this CURRENT learn value is saved as or is defined as a VOLATILE LEARN VALUE at step S35, and is also saved in the non-volatile memory (S36) as a POST-START-UP NON-VOLATILE LEARN VALUE (preferably overwriting any START-UP NON-VOLATILE LEARN VALUE); (ii) a learn flag is set to COMPLETE (S37); and (iii) a normal energization process begins or continues (S32)

If in step S34, the CURRENT LEARN VALUE is NOT within the range (S34=NO), then the learn flag is set to incomplete (S38). Alternatively in another embodiment (not shown), if S34=NO, then a default value or a factory set value or a zero value may be stored as a VOLATILE LEARN VALUE and in S35, and S36 and S37 are performed.

FIG. 4 shows the normal energization process of S32, and includes a correction process S40 using the NON-VOLATILE LEARN VALUE (either the START-UP NON-VOLATILE LEARN VALUE or the POST-START-UP NON-VOLATILE LEARN VALUE, whichever is stored according to FIG. 3). This correction process S40 may or may not include using a learn flag of FIG. 3.

Figure 5:
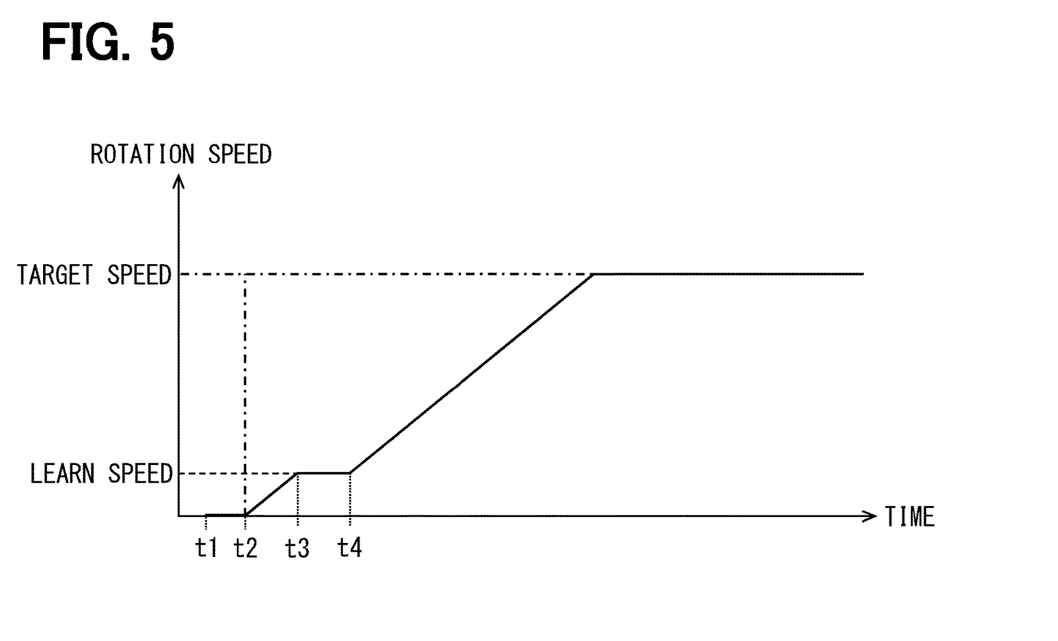
FIG. 5 is a time chart when a rotation speed at a power-on time does not exceed a learn speed according to the embodiment.
Figure 6:
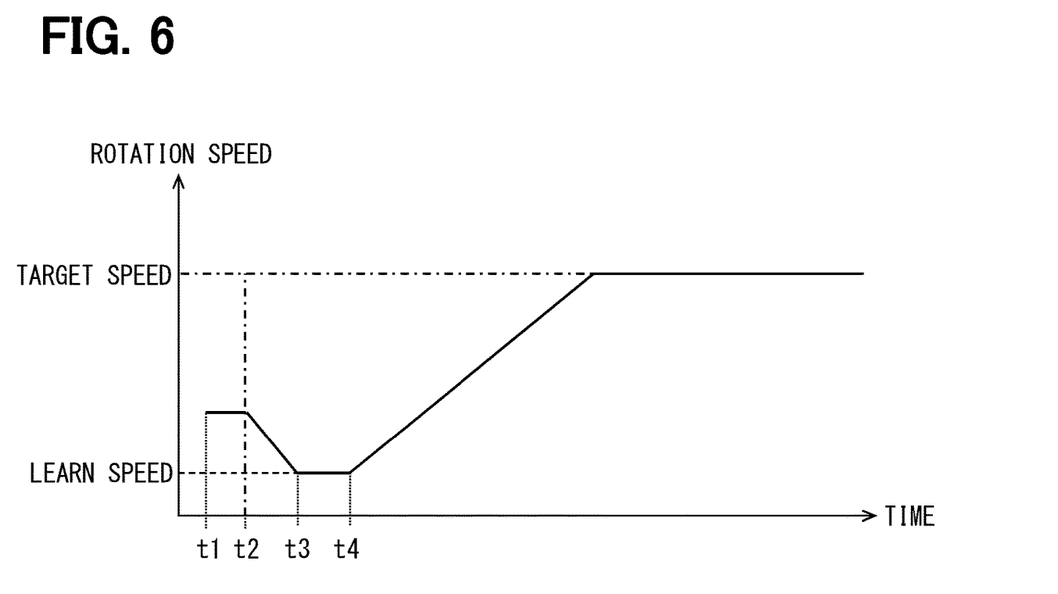
FIG. 6 is a time chart when the rotation speed at the power-on time exceeds the learn speed according to the embodiment.
Figure 7:
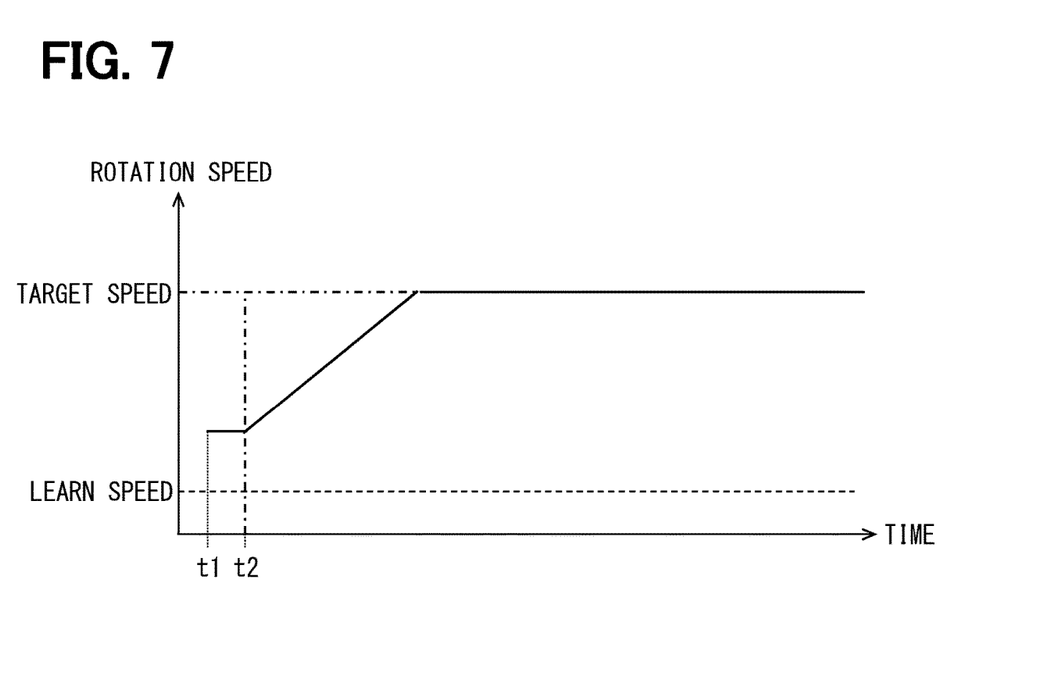
FIG. 7 is a time chart when a learn process is not performed according to the embodiment.

Here, the learn process is described with reference to FIGS. 5, 6, and 7. In FIGS. 5 to 7, timing t1 is timing of turning on the electric power. Timing t2 is a start timing of a high-level instruction indicating the operation of the motor 30 from the air conditioner ECU 300. A one-dot chain line indicates a high-level instruction. A solid line shows a rotation speed of the motor 30.

In an example of FIG. 5, there is a period in which the rotation speed has not yet reached the learn speed after timing t1. Then, the microcontroller 10 performs the learn process in the period from timing t3 to timing t4 (after the rotation speed reaches the learn speed at t3). The previous learn value is stored in the non-volatile memory 13 even during a period from timing t1 to t4. Therefore, the microcontroller 10 can perform the correction process using a learn value (using the START-UP NON-VOLATILE LEARN VALUE) even in the period from timing t1 to t4. Therefore, the microcontroller 10 performs correction processing using the previous learn value (START-UP NON-VOLATILE LEARN VALUE) read from the non-volatile memory 13 from timing t1 to t4, and controls the energization of the motor 30.

Further, in the blower motor control device 100, for example, when the vehicle is traveling at high speed with a window of the vehicle open, the motor 30 has a high load.

In such a situation, as shown in FIG. 6, the start (of the learn process) is performed from a state where the rotation speed exceeds the learn speed. That is, since the microcontroller 10 decelerates the rotation speed toward the learn speed, the microcontroller 10 operates differently from a situation of receiving a high-level instruction (i.e., instructed rotation speed, or target speed). Even in such case, the microcontroller 10 can perform the correction process using the learn value (using the START-UP NON-VOLATILE LEARN VALUE) even in the period from timing t1 to t4 as shown in FIG. 6.

Note that, as shown in FIG. 7, when the learn process is started from a state where the rotation speed exceeds the learn speed, the microcontroller 10 can avoid the deceleration operation and accelerate according to a high-level instruction. In such case, the learn process is not performed because the rotation speed does not become the learn speed. However, the microcontroller 10 can perform correction processing using the previous learn value read from the non-volatile memory 13, and can control the energization of the motor 30.

Returning to FIG. 3, in step S34, it is determined whether or not a learn value (also known as a NEW LEARN VALUE) is within a range (i.e., learn unit). The microcontroller 10 determines whether or not the learn value acquired in step S33 is within a predetermined range. That is, the microcontroller 10 compares the learn value acquired in step S33 with an upper limit value and a lower limit value that define the range. The range here is a range that can be taken as a learn value, that is, a range that can be assumed/expected. Further, the range here may be considered as a range in which the motor 30 is energizable within a normal range when the correction is performed based on the learn value. The range corresponds to a predetermined range in claims. In such manner, the microcontroller 10 determines whether or not the learn value acquired in step S33 is usable for correction.

When the microcontroller 10 determines that the learn value (NEW LEARN VALUE) acquired in step S33 is within the range, the microcontroller 10 proceeds the process to step S35. In other words, if the microcontroller 10 determines that the range is within the predetermined range, the microcontroller 10 determines that the learn value acquired in step S33 can be used for correction, and the process proceeds to step S35.

On the other hand, if the learn value acquired in step S33 is not determined to be within the range, the microcontroller 10 proceeds to step S38. In other words, if the microcontroller 10 does not determine that it is within the predetermined range, it is determined that the learn value acquired in step S33 cannot be used for correction, and the process proceeds to step S38.

In step S38, the learn flag is set to incomplete. That is, the microcontroller 10 sets the learn flag to 0. As described above, when the microcontroller 10 determines that the learn value acquired in step S33 is out of the range, the microcontroller 10 proceeds the process to step S32 without storing the learn value in the non-volatile memory 13. However, the present disclosure is not limited to such a configuration, and steps S34 and S38 may be omitted.

The present disclosure is not limited to the above. For example, in case of NO determination in step S34, the microcontroller 10 may adopt a default value as a used learn value for correction. Then, the microcontroller 10 proceeds the process to step S36 without proceeding to step S38. Therefore, in step S36, the microcontroller 10 stores the default value as the learn value in the non-volatile memory 13. In such case, step S38 may be omitted.

In step S35, the learn value (NEW LEARN VALUE) is set as the current learn value (CURRENT LEARN VALUE) (i.e., storage unit). In one embodiment, step S35 stores the NEW LEARN VALUE in the volatile memory as VOLATILE LEARN VALUE available for controlling the motor.

Then, in step S36, the learn value is stored in the non-volatile memory 13 (i.e., storage unit), and after storage is also known as a POST-START-UP NON-VOLATILE LEARN VALUE. The microcontroller 10 adopts the learn value (i.e., current learn value) acquired in step S33 as a learn value used for the correction. Then, the microcontroller 10 stores the current learn value in the non-volatile memory 13. That is, the microcontroller 10 overwrites and updates the learn value set in step S10 with the current learn value. Further, note that the microcontroller 10 stores the current learn value in the non-volatile memory 13 instead of the learn value set in step S10. The current learn value may be called as the latest learn value.

In the present embodiment, the learn value is stored in the non-volatile memory 13 only when YES determination is made in step S34. That is, the microcontroller 10 treats only the learn values within the range in the non-volatile memory 13 as a storage target. As a result, the microcontroller 10 can suppress the storage of inappropriate learn values. Further, note that the microcontroller 10 can suppress the abnormal energization of the motor 30.

In step S37, the learn flag is set to complete. That is, the microcontroller 10 sets the learn flag to 1. As described above, when the microcontroller 10 determines that the learn value acquired in step S33 is within the range, the microcontroller 10 stores the learn value in the non-volatile memory 13 and the process proceeds to step S32. Note that, if step S34 is omitted, the microcontroller 10 stores the learn value acquired in step S33 in the non-volatile memory 13 and the process proceeds to step S32.

In step S32, a normal energization process is performed (i.e., energization control unit). As shown in FIG. 4, the microcontroller 10 normally performs an energization process. That is, the microcontroller 10 performs the correction process using the learn value (S40). At such timing, the microcontroller 10 can perform the correction process using the latest learn value. Then, the microcontroller 10 performs an energization process to the motor 30 via the inverter circuit 20 in response to the control signal from the air conditioner ECU 300 (S41). As described above, after the rotation speed reaches the learn speed and the learn value is acquired, the microcontroller 10 can correct the position error by using the latest learn value and can control the energization of the motor 30. For example, after timing t4 in FIG. 5, the microcontroller 10 corrects the position error using the latest learn value and controls the energization of the motor 30.

Effects

As described above, the blower motor control device 100 stores the learn value in the non-volatile memory 13. Therefore, the motor control device can make corrections using the learn value stored in the non-volatile memory 13 until the rotation speed reaches the learn speed. Further, the blower motor control device 100 acquires a learn value when the rotation speed reaches the learn speed. Therefore, the blower motor control device 100 can perform correction by using the latest learn value after (i.e., once) the learn value is acquired. In such manner, the blower motor control device 100 can always correct the position error that occurs in the Hall element 41.

Therefore, the blower motor control device 100 can constantly suppress deterioration of the quietness and motor performance of the motor 30 due to the position error. That is, the blower motor control device 100 can always secure the quietness and motor performance of the motor 30 even if the position error occurs.

Although the present disclosure has been described in accordance with an embodiment, it is understood that the present disclosure is not limited to such an embodiment or a structure. The present disclosure encompasses various modifications and variations within the scope of equivalents. In addition, while the various elements are shown in various combinations and configurations, which are exemplary, other combinations and configurations, including more, less or only a single element added thereto or subtracted therefrom, are also within the spirit and scope of the present disclosure.

What is claimed is:

1. A motor control device configured to control energization of a motor, the motor control device comprising:
    a learn unit configured to acquire, as a new learn value, a correction amount for correcting a position error between a rotor and a rotation sensor, by stopping energization of the motor when a rotation speed of the rotor reaches a learn rotation speed, and by using an induced voltage generated in a coil of the motor and a detection signal from the rotation sensor during the stopped energization at the learn rotation speed;

a storage unit configured to store the new learn value in a non-volatile memory; and an energization control unit performing energization control of the motor (i) by reading a previous learn value from the non-volatile memory and by correcting the position error using the previous learn value until the rotation speed reaches the learn rotation speed, (ii) by acquiring the new learn value while operating at the learn rotation speed, and (iii) by using the new learn value acquired by the learn unit during the learn rotation speed to correct position errors, wherein the learn unit is configured to maintain the constant learn rotation speed during acquisition of the new learn value.

2. The motor control device of claim 1, wherein the learn unit acquires the new learn value only when no new value has been acquired after starting power to a microcontroller of the motor control device.

3. The motor control device of claim 1, wherein the storage unit treats the new learn value within a predetermined range as a storage target to be stored in the non-volatile memory.

4. The motor control device of claim 1, wherein the learn unit refrains from acquiring the learn value when the rotation speed does not fall to the learn rotation speed after a start of energization control.

5. A motor control device configured to control a motor, the motor control device comprising:

a microcontroller including: a central processing unit, a volatile memory, and a non-volatile memory; and an inverter, wherein the motor control device is configured to:

detect an induced voltage in a coil of the motor;

detect an output signal from a position detector of the motor;

perform a microcontroller starting process including:

(i) read a START-UP NON-VOLATILE LEARN VALUE from the non-volatile memory, and (ii) store the START-UP NON-VOLATILE LEARN VALUE into the volatile memory as a START-UP VOLATILE LEARN VALUE; and (iii) perform a main process including determining a CURRENT LEARN VALUE and while using the START-UP VOLATILE LEARN VALUE, wherein the learn values are associated with position errors in the position detector; and use the CURRENT LEARN VALUE to correct the output signal for controlling the motor, wherein determining a CURRENT LEARN VALUE includes:

receive an instruction to operate the motor at a target speed that is greater than a learn speed;

starting a speed less than the learn speed, increase the speed using the START-UP VOLATILE LEARN VALUE for correction of the detected motor position;

upon reaching the learn speed:

(iv) de-energize the inverter, (v) determine the CURRENT LEARN VALUE by detecting the induced phase voltage and by detecting the output signal from the position detector, (vi) store the CURRENT LEARN VALUE in the volatile memory as a VOLATILE LEARN VALUE, and (vii) store the CURRENT LEARN VALUE in the non-volatile memory as a POST-START-UP NON-VOLATILE LEARN VALUE, such that the POST-START-UP NON-VOLATILE LEARN VALUE survives turning OFF power to the microcontroller.

6. A motor control device configured to control a motor, the motor control device comprising:

a microcontroller including: a central processing unit, a volatile memory, and a non-volatile memory; and an inverter, wherein the motor control device is configured to:

detect an induced voltage in a coil of the motor;

detect an output signal from a position detector of the motor; and perform a motor operation process including:

(i) determine whether a learn flag associated with a learn value is complete, wherein a complete learn flag indicates that the learn value was determined after the microcontroller was most recently turned ON, wherein the motor control device is further configured to, upon a determination that the learn flag is NOT complete:

(ii) perform a learning process, including: operating the motor at a learn speed, detect the induced voltage, detect the output signal, and determine a NEW LEARN VALUE associated with a positional error of the output signal relative to the induced voltage, and (iii) determine whether the NEW LEARN VALUE is within a range.

7. The motor control device of claim 6, wherein the motor control device is further configured to, upon a determination that the learn flag is complete: (iv) perform normal energization control using the learn value to correct the detected output signal.

8. The motor control device of claim 6, wherein the motor control device is further configured to, upon a determination that the NEW LEARN VALUE is within the range:

(iv) store the NEW LEARN VALUE in the volatile memory as a VOLATILE LEARN VALUE, (v) store the NEW LEARN VALUE in the non-volatile memory as a POST-START-UP NON-VOLATILE LEARN VALUE, (vi) set the learn flag as complete, and (vii) perform normal energization processing using the VOLATILE LEARN VALUE.

9. The motor control device of claim 6, wherein the motor control device is further configured to, upon a determination that the NEW LEARN VALUE is NOT within the range:

(iv) use a predetermined DEFAULT VALUE in place of the NEW LEARN VALUE, such that the DEFAULT VALUE is stored in the volatile memory as a VOLATILE LEARN VALUE, (v) store the DEFAULT VALUE in the non-volatile memory as a POST-START-UP NON-VOLATILE LEARN VALUE, (vi) set the learn flag as complete, and (vii) perform normal energization processing using the VOLATILE LEARN VALUE.

* * * * *